United States Patent
Iwai

(10) Patent No.: US 11,626,944 B2
(45) Date of Patent: Apr. 11, 2023

(54) JITTER TOLERANCE MEASUREMENT APPARATUS AND JITTER TOLERANCE MEASUREMENT METHOD

(71) Applicant: ANRITSU CORPORATION, Kanagawa (JP)

(72) Inventor: Tatsuya Iwai, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/652,156

(22) Filed: Feb. 23, 2022

(65) Prior Publication Data
US 2022/0337359 A1    Oct. 20, 2022

(30) Foreign Application Priority Data

Apr. 14, 2021   (JP) .............................. JP2021-068501

(51) Int. Cl.
| | |
|---|---|
| H04L 1/00 | (2006.01) |
| H04L 1/24 | (2006.01) |
| H04L 41/22 | (2022.01) |
| H04L 1/20 | (2006.01) |

(52) U.S. Cl.
CPC .............. *H04L 1/244* (2013.01); *H04L 1/203* (2013.01); *H04L 1/205* (2013.01); *H04L 41/22* (2013.01)

(58) Field of Classification Search
None
See application file for complete search history.

(56) References Cited

U.S. PATENT DOCUMENTS

| | | | | |
|---|---|---|---|---|
| 6,985,823 | B2 * | 1/2006 | Fishman | H04B 10/07 702/69 |
| 7,636,387 | B2 * | 12/2009 | Yamaguchi | G01R 31/31725 375/226 |
| 8,143,959 | B2 * | 3/2012 | Yaginuma | H03C 3/095 331/78 |
| 8,989,329 | B2 * | 3/2015 | Hammad | H04L 1/00 375/376 |
| 2005/0031029 | A1 * | 2/2005 | Yamaguchi | G01R 31/31709 375/226 |
| 2008/0040060 | A1 * | 2/2008 | Hou | G01R 31/31937 702/82 |

(Continued)

FOREIGN PATENT DOCUMENTS

| | | |
|---|---|---|
| JP | 6199420 B2 | 9/2017 |
| JP | 2021-136651 A | 9/2021 |

*Primary Examiner* — Mujtaba M Chaudry
(74) *Attorney, Agent, or Firm* — Pearne & Gordon, LLP

(57) ABSTRACT

There are provided a data comparison unit that detects an FEC symbol error of a signal under test output from a DUT in accordance with an input of a jitter signal, an error counting unit that counts the number of detected FEC symbol errors for each codeword for each phase modulation amount, a codeword classification unit that classifies a plurality of codewords included in the signal under test into a plurality of groups based on the counted number of FEC symbol errors, a codeword number counting unit that counts the number of codewords in each group for each phase modulation amount, and a display control unit that controls a display of a first graph having a horizontal axis as the phase modulation amount and a vertical axis as a ratio of the number of codewords in each group, on a display screen.

6 Claims, 6 Drawing Sheets

(56) References Cited

U.S. PATENT DOCUMENTS

2008/0048726 A1* 2/2008 Hafed .............. G01R 31/31725
 702/69
2018/0234177 A1* 8/2018 Li .......................... H04B 10/40
2019/0383873 A1* 12/2019 Hojabri .............. G01R 31/3167

* cited by examiner

| Modulation frequency [MHz] | Lower limit value [UI] | Upper limit value [UI] |
|---|---|---|
| 40 | 0.05 | 0.5 |
| 12 | 0.05 | 0.5 |
| 4 | 0.05 | 0.5 |
| 1.333 | 0.15 | 1.5 |

FIG. 2

| Parameter | Case A | Case B | Case C | Case D | Case E | Unit |
|---|---|---|---|---|---|---|
| Modulation frequency | 0.04 | 1.333 | 4 | 12 | 40 | MHz |
| Phase modulation amount | 5 | 0.15 | 0.05 | 0.05 | 0.05 | UI |

FIG. 3

JITTER TOLERANCE MEASUREMENT APPARATUS AND JITTER TOLERANCE MEASUREMENT METHOD

TECHNICAL FIELD

The present invention relates to a jitter tolerance measurement apparatus and a jitter tolerance measurement method, and more particularly to a jitter tolerance measurement apparatus and a jitter tolerance measurement method that measures a jitter tolerance of a device under test (DUT) based on a communication standard using forward error correction.

BACKGROUND ART

In recent years, IP data traffic is continued to increase due to the spread of 5th generation mobile communication systems or Internet of things (IoT) devices. In data centers that support large-capacity data communication, the introduction of a 400 GbE communication method is progressing, and progress to 800 GbE/1.6 TbE is being considered in order to support further large-capacity transmission in the future. In 200 GbE/400 GbE standardized in 2017, pulse amplitude modulation 4 (PAM4) is adopted as a transmission format in order to increase the transmission capacity. As compared with non return to zero (NRZ) that transmits with two values in the related art, PAM4 that transmits with four values can double the transmission speed, but a signal to noise ratio (SN ratio) deteriorates by approximately 10 dB. Therefore, in the physical layer transmission of 200 GbE/400 GbE, it becomes difficult to realize the error-free transmission that is natural in NRZ transmission, due to an increase in the transmission speed and the deterioration of the SN ratio, so a transmission method premised on forward error correction (FEC) is used.

For example, in FEC coding by Reed Solomon FEC (RS-FEC) (544, 514) defined in IEEE 802.3, a codeword (CW) having 544 FEC symbols including a parity portion consisting of 30 FEC symbols and a message portion consisting of 514 FEC symbols is generated. Further, in FEC coding by RS-FEC (528, 514) defined in IEEE 802.3, a codeword having 528 FEC symbols including a parity portion consisting of 14 FEC symbols and a message portion consisting of 514 FEC symbols is generated.

In this manner, by including the parity portion of 30 FEC symbols (or 14 FEC symbols) in the codeword, it is possible to correct an error of the FEC symbols of the maximum 15 (or 7) per codeword. Therefore, a codeword in which the number of FEC symbol errors in one codeword is (or 8) or more is an uncorrectable codeword of which error cannot be corrected. One FEC symbol has 10 bits, and if the number of bit errors included in one FEC symbol is in a range of 1 to 10, the FEC symbol is an FEC symbol including an error. Therefore, depending on a distribution of bit errors, an uncorrectable codeword may occur with a minimum of 16-bit error (or 8-bit error), and the uncorrectable codeword may not occur even with a maximum of 150-bit error (or 70-bit error).

In the related art, a jitter tolerance test is performed to gradually add jitter to a device under test (DUT) and measure how much jitter amount (phase modulation amount) the DUT can withstand without an error occurring (for example, see Patent Document 1). In the jitter tolerance test so far, measurements using only a bit error rate (BER) as a target are performed, and in a test premised on FEC, not only the BER but also a ratio of the number of FEC symbol errors for each codeword is a very important index. Since there is no fixed correlation between the BER and the number of uncorrectable codewords, a result of a jitter tolerance of FEC differs greatly depending on whether or not an uncorrectable codeword is generated even under the same the BER condition, for example.

Meanwhile, although a jitter tolerance measurement apparatus as disclosed in Patent Document 1 can measure and estimate a jitter tolerance based on a BER, there is a problem that the jitter tolerance test corresponding to FEC cannot be performed.

On the other hand, a network test apparatus that receives a codeword transmitted from a DUT, and displays a distribution of the number of FEC symbol errors is proposed (see, for example, Patent Document 2).

RELATED ART DOCUMENT

Patent Document

[Patent Document 1] Japanese Patent No. 6199420
[Patent Document 2] Japanese Patent Application No. 2020-033640

DISCLOSURE OF THE INVENTION

Problem that the Invention is to Solve

In the network test apparatus disclosed in Patent Document 2, for example, a screen illustrating the distribution of the number of FEC symbol errors as illustrated in FIG. 7 is provided. In this manner, it is possible to graph and display the distribution of the number of FEC symbol errors during a measurement period, and in order to check how this distribution is changed due to an increase in jitter amount, it is necessary to acquire data each time and graph the data again. That is, a plurality of graphs are created according to the jitter amount, which causes a problem that analysis of measurement results becomes complicated.

The present invention is made to solve such problems in the related art, and to provide a jitter tolerance measurement apparatus and a jitter tolerance measurement method capable of representing a distribution of FEC symbol errors having different jitter amounts (phase modulation amounts) in one graph.

Means for Solving the Problem

According to an aspect of the present invention, there is provided a jitter tolerance measurement apparatus including: a data signal output unit that outputs a data signal including a plurality of codewords having a plurality of forward error correction (FEC) symbols; a jitter signal generator that phase-modulates the data signal to generate a jitter signal, and inputs the jitter signal to a device under test (DUT); a modulation control unit that performs control of changing a phase modulation amount of the phase modulation; a data comparison unit that detects a bit error and an FEC symbol error of a signal under test output from the device under test (DUT) in accordance with the input of the jitter signal; and an error counting unit that counts the number of bit errors of the signal under test detected by the data comparison unit and the number of FEC symbol errors for each codeword of the signal under test detected by the data comparison unit, in which the error counting unit includes a codeword classification unit that counts the number of FEC symbol errors for each codeword for each phase modulation amount as the number of FEC symbol errors, and classifies the plurality of codewords included in the signal under test into a plurality of groups with the counted number of FEC symbol errors, a codeword number counting unit that counts the number of codewords of the codewords belonging to each of the groups classified by the codeword classification unit for each phase modulation amount, and a display control unit that controls a display of a first graph on a display screen, by using a horizontal axis as the phase modulation amount and a first vertical axis as the number of codewords or a ratio of the number of codewords in each of the groups counted by the codeword number counting unit.

With this configuration, the jitter tolerance measurement apparatus according to the present invention classifies the plurality of codewords included in the signal under test into the plurality of groups according to the number of FEC symbol errors, and counts the number of codewords of the codewords belonging to each group for each phase modulation amount. As a result, with the jitter tolerance measurement apparatus according to the present invention, it is possible to represent a distribution of FEC symbol errors having different jitter amounts (phase modulation amounts) in one graph, by using the horizontal axis as the phase modulation amount, and the first vertical axis as the number of codewords or a ratio of the number of codewords of each group.

Further, the jitter tolerance measurement apparatus according to the present invention, may further include: a bit error rate (BER) calculation unit that calculates a bit error rate of the signal under test, based on the number of bit errors counted by the error counting unit, in which the display control unit may control a display of a second graph to be superimposed on the first graph on the display screen, by using the horizontal axis as the phase modulation amount and a second vertical axis as the bit error rate of the signal under test calculated by the BER calculation unit.

With this configuration, the jitter tolerance measurement apparatus according to the present invention may superimpose and display the distribution of the FEC symbol errors and a change of the BER in the graph with the horizontal axis as the phase modulation amount.

Further, in the jitter tolerance measurement apparatus according to the present invention, the display control unit may display the number of codewords or the ratio of the number of codewords in each of the groups counted by the codeword number counting unit, in different colors for each of the groups in the first graph.

With this configuration, the jitter tolerance measurement apparatus according to the present invention displays the distribution of FEC symbol errors in different colors for each group, so that the distribution of FEC symbol errors may be visually and clearly represented on the graph.

Further, the jitter tolerance measurement apparatus according to the present invention, may further include: an operation unit that changes a scale of the first vertical axis of the first graph.

With this configuration, with the jitter tolerance measurement apparatus according to the present invention, it is possible to appropriately enlarge and reduce the scale of the first vertical axis by the operation of the operation unit by a user, so that the number of codewords or the ratio of the number of codewords of a low-rate codeword such as an Uncorrectable Codeword can also be visually and clearly represented on the graph.

Further, according to another aspect of the present invention, there is provided a jitter tolerance measurement method including: a data signal output step of outputting a data signal including a plurality of codewords having a plurality of forward error correction (FEC) symbols; a jitter signal generation step of phase-modulating the data signal to generate a jitter signal, and inputting the jitter signal to a device under test (DUT); a modulation control step of performing control of changing a phase modulation amount of the phase modulation; a data comparison step of detecting a bit error and an FEC symbol error of a signal under test output from the device under test (DUT) in accordance with the input of the jitter signal; and an error counting step of counting the number of bit errors of the signal under test detected in the data comparison step and the number of FEC symbol errors for each codeword of the signal under test detected in the data comparison step, in which the error counting step includes a codeword classification step of counting the number of FEC symbol errors for each codeword for each phase modulation amount as the number of FEC symbol errors, and classifying the plurality of codewords included in the signal under test into a plurality of groups with the counted number of FEC symbol errors, a codeword number counting step of counting the number of codewords of the codewords belonging to each of the groups classified in the codeword classification step for each phase modulation amount, and a display control step of controlling a display of a first graph on a display screen, by using a horizontal axis as the phase modulation amount and a first vertical axis as the number of codewords or a ratio of the number of codewords in each of the groups counted in the codeword number counting step.

Further, the jitter tolerance measurement method according to the present invention, may further include: a bit error rate (BER) calculation step of calculating a bit error rate of the signal under test, based on the number of bit errors counted in the error counting step, in which in the display control step, a display of a second graph may be controlled to be superimposed on the first graph on the display screen, by using the horizontal axis as the phase modulation amount and a second vertical axis as the bit error rate of the signal under test calculated by the BER calculation unit.

Advantage of the Invention

The present invention provides a jitter tolerance measurement apparatus and a jitter tolerance measurement method capable of representing a distribution of FEC symbol errors having different jitter amounts (phase modulation amounts) in one graph.

BRIEF DESCRIPTION OF THE DRAWINGS

FIG. 2 is a table illustrating an example of a lower limit value and an upper limit value of a phase modulation amount for each modulation frequency set by a modulation control unit illustrated in FIG. 1.

FIG. 3 is a table illustrating a combination of a modulation frequency and the phase modulation amount in a jitter tolerance test of a 400 GAUI-8 standard.

BEST MODE FOR CARRYING OUT THE INVENTION

Hereinafter, embodiments of a jitter tolerance measurement apparatus and a jitter tolerance measurement method according to the present invention will be described with reference to the drawings.

Figure 1:
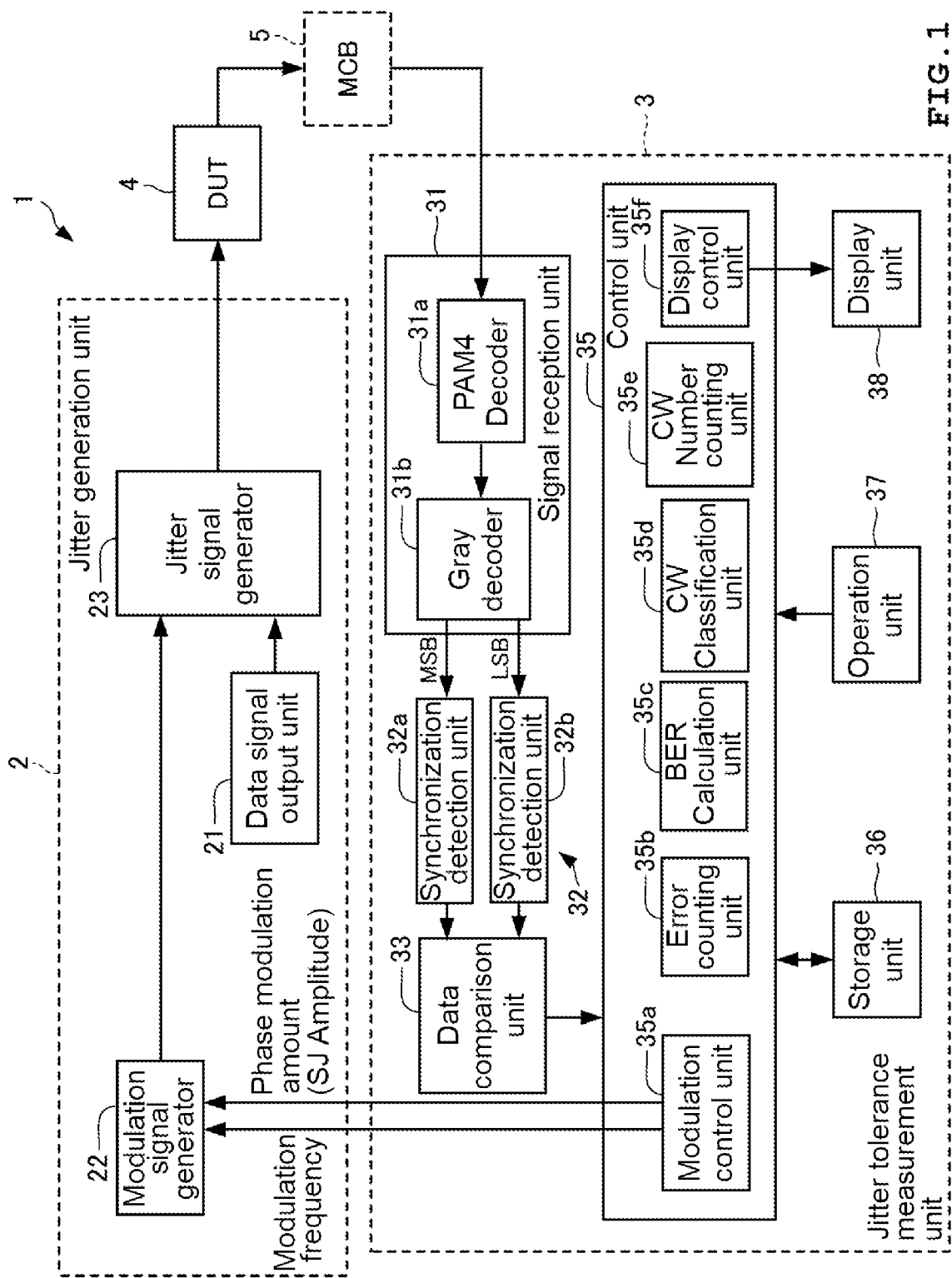
FIG. 1 is a block diagram illustrating a configuration of a jitter tolerance measurement apparatus according to an embodiment of the present invention.

As illustrated in FIG. 1, a jitter tolerance measurement apparatus 1 according to the embodiment of the present invention is schematically configured to include a jitter generation unit 2 and a jitter tolerance measurement unit 3. The jitter tolerance measurement apparatus 1 measures a jitter tolerance indicating how much a DUT 4 based on a communication standard using FEC can withstand a fluctuation (jitter) of a phase of an input data signal or the like.

The communication standards supported by the DUT 4 are, for example, Ethernet (registered trademark) such as 800/400/200/100/50 GbE and 1.6 TbE, PCI-Express (registered trademark), and the like. It is assumed that the DUT 4 outputs an electric signal or an optical signal as a signal under test, and does not perform error correction on the input data signal.

For example, as the DUT 4 that outputs the optical signal, an optical transceiver is used. For example, as the DUT 4 that outputs the electric signal, a PPG, a digital signal processor (DSP) used in an optical module, or the like is used. The optical transceiver is a module for converting an electric signal and an optical signal into each other. For example, an optical transmission and reception device such as a transmitter optical sub-assembly (TOSA) including an electro-absorption modulator integrated laser diode (EML) or a receiver optical sub-assembly (ROSA) including a photodiode is mounted. A standard of the optical transceiver includes QSFP-DD, OSPF, CFP8, SFP56, or the like.

In a case where the DUT 4 outputs an optical signal, a module compliance board (MCB) 5 that O/E-converts the optical signal output from the DUT 4 into an electric signal is connected to the DUT 4. As a result, the electric signal is input to the jitter tolerance measurement unit 3 regardless of whether the DUT 4 outputs the electric signal or the optical signal.

The jitter generation unit 2 generates a phase-modulated jitter signal by a phase modulation amount proportional to an amplitude of a modulation signal (sine jitter amplitude (SJ amplitude)), and includes a data signal output unit 21, a modulation signal generator 22, and a jitter signal generator 23, as illustrated in FIG. 1.

The data signal output unit 21 outputs a data signal including a plurality of codewords including a plurality of FEC symbols. The data signal output unit 21 can output, for example, an NRZ signal of two values or a multi-valued modulation signal having three or more values as a data signal. In the present embodiment, a case where the NRZ signal of two values and the PAM4 signal which is a multi-valued modulation signal of four values are output from the data signal output unit 21 will be mainly described as an example.

The NRZ signal output from the data signal output unit 21 is configured with data of two bit strings consisting of 0 and 1 (hereinafter, also simply referred to as "bit string data"), and FEC coding by RS-FEC (528, 514) defined in IEEE 802.3 is performed on the NRZ signal. Further, the PAM4 signal output from the data signal output unit 21 is configured with data of four PAM4 symbol strings consisting of 0 (00), 1 (01), 2 (10), and 3 (11), and FEC coding by RS-FEC (544, 514) defined in IEEE 802.3 is performed on the PAM4 signal. These data signals also serve as reference data when measuring a BER, an FEC symbol error, and the like of the DUT 4 in the jitter tolerance measurement unit 3.

Specific data signals generated by the data signal output unit 21 include, for example, a periodic pattern such as various pseudo-random patterns (pseudo random bit sequence (PRBS)) such as PRBS7 (pattern length: $2^7-1$), PRBS9 (pattern length: $2^9-1$), PRBS10 (pattern length: $2^{10}-1$), PRBS11 (pattern length: $2^{11}-1$), PRBS15 (pattern length: $2^{11}-1$), PRBS20 (pattern length: $2^{20}-1$), an evaluation pattern for evaluating PAM4 signals such as PRBS13Q, PRBS31Q, SSPRQ, and a scramble idle pattern with Reed-Solomon forward error correction (RS-FEC) encoding.

The modulation signal generator 22 generates a modulation signal for adding jitter to a data signal output from the data signal output unit 21. A modulation frequency and a phase modulation amount (or SJ amplitude) of the modulation signal generated by the modulation signal generator 22 can be set to desired values of a user by, for example, an operation of the operation unit 37 described below.

The jitter signal generator 23 generates a jitter signal by phase-modulating the data signal output from the data signal output unit 21 with a desired phase modulation amount by the modulation signal output from the modulation signal generator 22, and inputs the generated jitter signal to the DUT 4.

The jitter tolerance measurement unit 3 receives a signal under test output from the DUT 4 in accordance with the input of the jitter signal generated by the jitter generation unit 2 to measure a jitter tolerance, and is configured to include a signal reception unit 31, a synchronization detection unit 32 (32a and 32b), a data comparison unit 33, a control unit 35, a storage unit 36, an operation unit 37, and a display unit 38, as illustrated in FIG. 1. Further, the signal reception unit 31 includes a PAM4 decoder 31a and a Gray decoder 31b.

In a case where the jitter signal input to the DUT 4 is a PAM4 signal, the PAM4 decoder 31a generates the most significant bit string data (hereinafter, also referred to as "most significant bit (MSB) data") and the least significant bit string data (hereinafter, also referred to as "least significant bit (LSB) data") from the signal under test (PAM4 signal).

In a case where the PAM4 signal input to the DUT 4 is coded based on Gray Code, the Gray decoder 31b decodes the MSB data and the LSB data output from the PAM4 decoder 31a based on Gray Code. On the other hand, in a case where the PAM4 signal input to the DUT 4 is not encoded based on Gray Code, the Gray decoder 31b passes the MSB data and the LSB data output from the PAM4 decoder 31a as they are.

In a case where the jitter signal input to the DUT 4 is a PAM4 signal, the synchronization detection unit 32a synchronizes MSB reference data, which is MSB data of a reference PAM4 signal read from the storage unit 36 to be described below, with the MSB data of the signal under test output from the Gray decoder 31b. Further, the synchronization detection unit 32a sets a head of a pattern of the MSB data of the signal under test synchronized with the MSB reference data as a head of a codeword, and divides the MSB data of the signal under test into FEC symbols every 10 bits from the head.

In a case where the jitter signal input to the DUT 4 is a PAM4 signal, the synchronization detection unit 32b synchronizes LSB reference data, which is LSB data of a reference PAM4 signal read from the storage unit 36 to be described below, with the LSB data of the signal under test output from the Gray decoder 31b. Further, the synchronization detection unit 32b sets a head of a pattern of the LSB data of the signal under test synchronized with the LSB reference data as a head of a codeword, and divides the LSB data of the signal under test into FEC symbols every 10 bits from the head.

The data comparison unit 33 compares each of the MSB data and the LSB data of the signal under test output from the synchronization detection units 32a and 32b with each of the MSB reference data and the LSB reference data so as to detect each of the most significant bit error (hereinafter, referred to as an "MSB error") and the least significant bit error (hereinafter, also referred to as an "LSB error"). The data comparison unit 33 detects as one FEC symbol error if an error occurs even in 1 bit within 10 bits, in the MSB data and the LSB data of the signal under test divided by 10 bits.

In a case where the jitter signal input to the DUT 4 is an NRZ signal, the signal reception unit 31 samples the signal under test (NRZ signal) at a predetermined sampling cycle, and converts the resultant signal into bit string data. The bit string data converted by the signal reception unit 31 is input to the synchronization detection unit 32.

In a case where the jitter signal input to the DUT 4 is the NRZ signal, the synchronization detection unit 32 synchronizes NRZ reference data, which is bit string data of a reference NRZ signal read from the storage unit 36 to be described below, with bit string data of the signal under test output from the signal reception unit 31. Further, the synchronization detection unit 32 sets a head of a pattern of the bit string data of the signal under test synchronized with the NRZ reference data as a head of a codeword, and divides the bit string data of the signal under test into FEC symbols every 10 bits from the head.

In a case where the jitter signal input to the DUT 4 is the NRZ signal, the data comparison unit 33 compares the bit string data of the signal under test output from the synchronization detection unit 32 with the NRZ reference data so as to detect a bit error of the signal under test. The data comparison unit 33 detects as one FEC symbol error if an error occurs even in 1 bit within 10 bits, in the bit string data of the signal under test divided by 10 bits.

The storage unit 36 stores bit string data, MSB data, and LSB data of a data signal of a known pattern output from the data signal output unit 21. The bit string data, the MSB data, and the LSB data of the data signal of the known pattern are reference data as references when being compared with the bit string data, the MSB data, and the LSB data of the signal under test transmitted from the DUT 4. Further, the storage unit 36 stores a counting result by an error counting unit 35b, which will be described below, of the control unit 35. In addition, the storage unit 36 stores the comparison result data or the like by the data comparison unit 33 together with the bit string data, the MSB data, and the LSB data of the signal under test synchronized with the reference data. Further, the storage unit 36 stores data obtained by the control unit 35, which will be described below, in which the BER and the number of FEC symbol errors for each codeword of the signal under test are associated with the phase modulation amount and the modulation frequency.

The operation unit 37 is for accepting an operation input by the user, and is configured with, for example, a touch panel including a touch sensor for detecting a contact position by a contact operation with an input surface corresponding to a display screen of the display unit 38. When the user touches a position of a specific item displayed on the display screen with a finger, a stylus, or the like, the operation unit 37 recognizes a coincidence between the position detected by the touch sensor on the display screen and the position of the item, and outputs a signal for executing a function assigned to each item the control unit 35. The operation unit 37 may be operably displayed on the display unit 38, or may be configured to include an input device such as a keyboard or a mouse.

It is possible to set the modulation frequency, a lower limit value and an upper limit value of the phase modulation amount, a step width of the phase modulation amount, a measurement time for each phase modulation amount, and the like by an operation input to the operation unit 37 by the user.

The display unit 38 is configured with a display device such as a liquid crystal display or a CRT, and displays various display contents such as a setting screen or a measurement result related to the jitter tolerance measurement of the DUT 4 on the display screen, based on display control by a display control unit 35f to be described below. Further, the display unit 38 displays an operation target such as a button, a soft key, a pull-down menu, and a text box for setting various conditions.

The control unit 35 is configured with, for example, a microcomputer or a personal computer including a central processing unit (CPU), a read only memory (ROM), a random access memory (RAM), a hard disk drive (HDD), or the like to control an operation of each unit described above constituting the jitter tolerance measurement apparatus 1. Further, the control unit 35 transfers a predetermined program stored in the ROM or the like to the RAM and executes the program on the CPU, so at least some of a modulation control unit 35a, an error counting unit 35b, a BER calculation unit 35c, a CW classification unit 35d, a CW number counting unit 35e, and a display control unit 35f, which will be described below, can be configured by software. Here, CW refers to a codeword. At least some of the modulation control unit 35a, the error counting unit 35b, the BER calculation unit 35c, the CW classification unit 35d, the CW number counting unit 35e, and the display control unit 35f can be configured with a digital circuit such as a field programmable gate array (FPGA) or an application specific integrated circuit (ASIC). Alternatively, at least some of the modulation control unit 35a, the error counting unit 35b, the BER calculation unit 35c, the CW classification unit 35d, the CW number counting unit 35e, and the display control unit 35f can be configured as appropriate in combination with a hardware process by the digital circuit and a software process by the predetermined program.

The modulation control unit 35a performs control of changing the modulation frequency and the phase modulation amount of the modulation signal output from the modulation signal generator 22, based on setting information from the operation unit 37. FIG. 2 illustrates an example of a combination of a modulation frequency [MHz] set by the modulation control unit 35a according to an operation input to the operation unit 37 by a user, and a lower limit value [UI] and an upper limit value [UI] of the phase modulation amount. Further, FIG. 3 illustrates a combination of a modulation frequency [MHz] and a phase modulation amount [UI] specified in a jitter tolerance test of a 400

GAUI-8 standard. In the 400 GAUI-8 standard, it is required that an Uncorrectable Codeword does not occur and a BER is equal to or less than 1E-5, even for any of five combinations (Case A to Case E) of the modulation frequency and the phase modulation amount illustrated in FIG. 3.

As illustrated in FIG. 2, the modulation control unit 35a according to the present embodiment can match the lower limit value [UI] of the phase modulation amount with a standard value, and set the upper limit value [UI] of the phase modulation amount to a value more than a standard phase modulation amount [UI]. As a result, the jitter tolerance measurement apparatus 1 according to the present embodiment not only tests whether or not the DUT 4 satisfies a jitter tolerance specified in the standard, but also performs a test for checking a jitter tolerance margin of the DUT 4.

The error counting unit 35b counts the number of FEC symbol errors for each codeword detected by the data comparison unit 33, for each phase modulation amount. One codeword (544FEC symbol) of a PAM4 signal has MSB data of a 272FEC symbol and LSB data of the 272FEC symbol. Therefore, the number of FEC symbol errors in one codeword of the PAM4 signal is a sum of the number of FEC symbol errors in the MSB data of the 272 FEC symbol and the LSB data of the 272 FEC symbol.

Further, in a case where the jitter signal input to the DUT 4 is an NRZ signal, the error counting unit 35b counts the number of bit errors detected by the data comparison unit 33 for each phase modulation amount. In addition, in a case where the jitter signal input to the DUT 4 is a PAM4 signal, the error counting unit 35b counts the number of MSB errors and the number of LSB errors detected by the data comparison unit 33 for each phase modulation amount.

In a case where the jitter signal input to the DUT 4 is an NRZ signal, the BER calculation unit 35c divides the number of bit errors counted for each phase modulation amount by the error counting unit 35b, by a total number of bits of the corresponding bit string data to calculate the resultant value as a BER of the signal under test. Further, in a case where the jitter signal input to the DUT 4 is the PAM4 signal, the BER calculation unit 35c divides a sum of the number of MSB errors and the number of LSB errors counted for each phase modulation amount by the error counting unit 35b, by a total number of bits of the corresponding MSB data and LSB data to calculate the resultant value as the BER of the signal under test.

The control unit 35 measures the BER and the FEC symbol error of the signal under test, over a measurement time input from the operation unit 37. When the measurement time ends, the modulation control unit 35a controls to change the phase modulation amount of the modulation signal or to change both the modulation frequency and the phase modulation amount of the modulation signal, based on the measurement results. For example, the modulation control unit 35a controls to increase the phase modulation amount in a case where an Uncorrectable Codeword does not occur at an end of the measurement or in a case where the BER is less than a reference value (1E-5 or the like). Further, the modulation control unit 35a controls to change both the modulation frequency and the phase modulation amount in a case where an Uncorrectable Codeword occurs, in a case where the BER is more than the reference value, or in a case where the phase modulation amount reaches the upper limit value. At this time, the number of occurrences of Uncorrectable Codewords, an occurrence rate, and a threshold value of the BER value can be freely set by the user by using the operation unit 37.

The CW classification unit 35d classifies a plurality of codewords included in the signal under test transmitted from the DUT 4 into a plurality of groups, based on the number of FEC symbol errors counted by the error counting unit 35b.

In a case where the jitter signal input to the DUT 4 is the NRZ signal, the CW classification unit 35d classifies the plurality of codewords into, for example, nine groups N0 to N7 and UCW. The groups N0, N1, N2, N3, N4, N5, N6, and N7 are groups of codewords in which the numbers of FEC symbol errors are respectively 0, 1, 2, 3, 4, 5, 6, and 7. The group UCW is a group of codewords having an FEC symbol error number of 8 or more and becoming an Uncorrectable Codeword.

In a case where the jitter signal input to the DUT 4 is the PAM4 signal, the CW classification unit 35d classifies the plurality of codewords into 17 groups N0 to N15 and UCW, for example. The groups N0, N1, N2, N3, N4, N5, N6, N7, N8, N9, N10, N11, N12, N13, N14, and N15 are groups of codewords in which the numbers of FEC symbol errors are respectively 0, 1, 2, 3, 4, 5, 6, 7, 8, 9, 10, 11, 12, 13, 14, and 15. The group UCW is a group of codewords having an FEC symbol error number of 16 or more and becoming an Uncorrectable Codeword.

The CW number counting unit 35e counts the number of codewords of the codewords belonging to each group classified by the CW classification unit 35d for each phase modulation amount.

Figure 4:
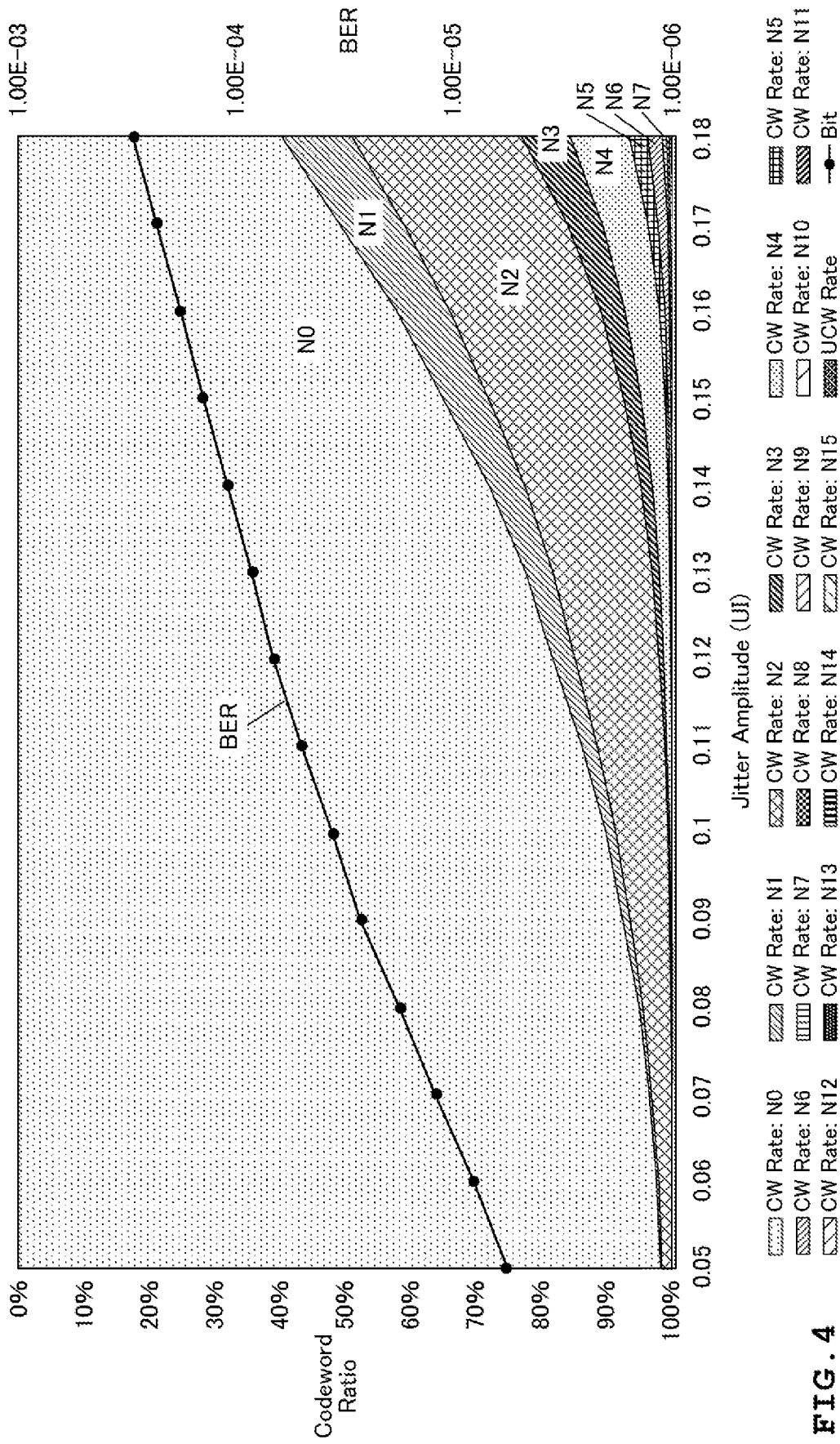
FIG. 4 is a graph illustrating a distribution of the number of FEC symbol errors and a BER for each phase modulation amount of which display is controlled by a display control unit illustrated in FIG. 1.
Figure 5:
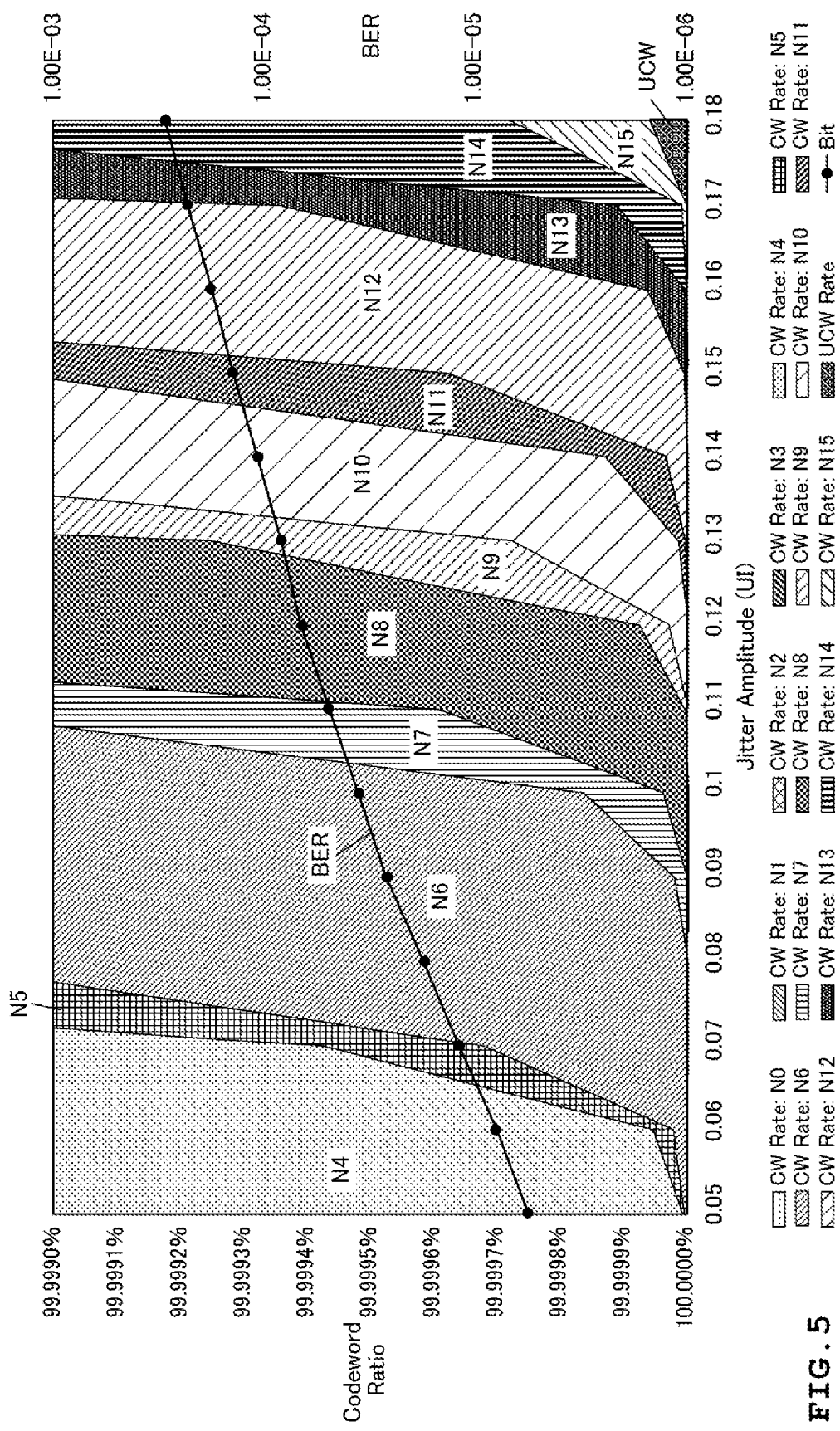
FIG. 5 is a graph in which a lower side of a vertical axis on a left side of the graph in FIG. 4 is enlarged 100,000 times.

FIGS. 4 and 5 are examples of graphs of which display is controlled by the display control unit 35f on a display screen of the display unit 38 in a case where a jitter signal input to the DUT 4 is a PAM4 signal. The display control unit 35f controls a display of a first graph on the display screen of the display unit 38, by using a horizontal axis as a phase modulation amount, and a vertical axis on the left side (first vertical axis) as the number of codewords or a ratio of the number of codewords of each group counted by the CW number counting unit 35e. That is, the first graph illustrates a distribution of the number of FEC symbol errors for each phase modulation amount. This example is displayed such that a modulation frequency is 40 MHz, and a range of the horizontal axis is 0.05 UI to 0.18 UI.

In addition, the display control unit 35f displays the number of codewords or the ratio of the number of codewords of each group counted by the CW number counting unit 35e in different colors for each group in the first graph. Further, the display control unit 35f controls a display of a second graph to be superimposed on the first graph on the display screen, by using the horizontal axis as the phase modulation amount, and the vertical axis on the right side (second vertical axis) as a BER of the signal under test calculated by the BER calculation unit 35c.

The vertical axis on the left side, the vertical axis on the right side, and the horizontal axis can all be changed to any scale by an operation of the operation unit 37 by the user. FIG. 5 is a graph in which the lower side of the vertical axis on the left side of the first graph in FIG. 4 is enlarged 100,000 times by an operation of the operation unit 37 by the user.

In the first graph illustrated in FIGS. 4 and 5, each region indicated by N0 to N15 and UCW represents a ratio of the number of codewords for each phase modulation amount of the groups N0 to N15 and UCW. For each phase modulation amount, the ratio of the number of codewords of the groups N0 to N15 and UCW is displayed in this order along the vertical axis direction. From the first graph and the second graph illustrated in FIGS. 4 and 5, it can be seen at a glance that as the phase modulation amount increases, the BER of the signal under test deteriorates and the number of FEC symbol errors in one codeword increases.

In the first graph illustrated in FIGS. 4 and 5, the vertical axis on the left side is the ratio of the number of codewords of each group counted by the CW number counting unit 35e, and the vertical axis on the left side may be the number of codewords of each group counted by the CW number counting unit 35e.

Figure 6:
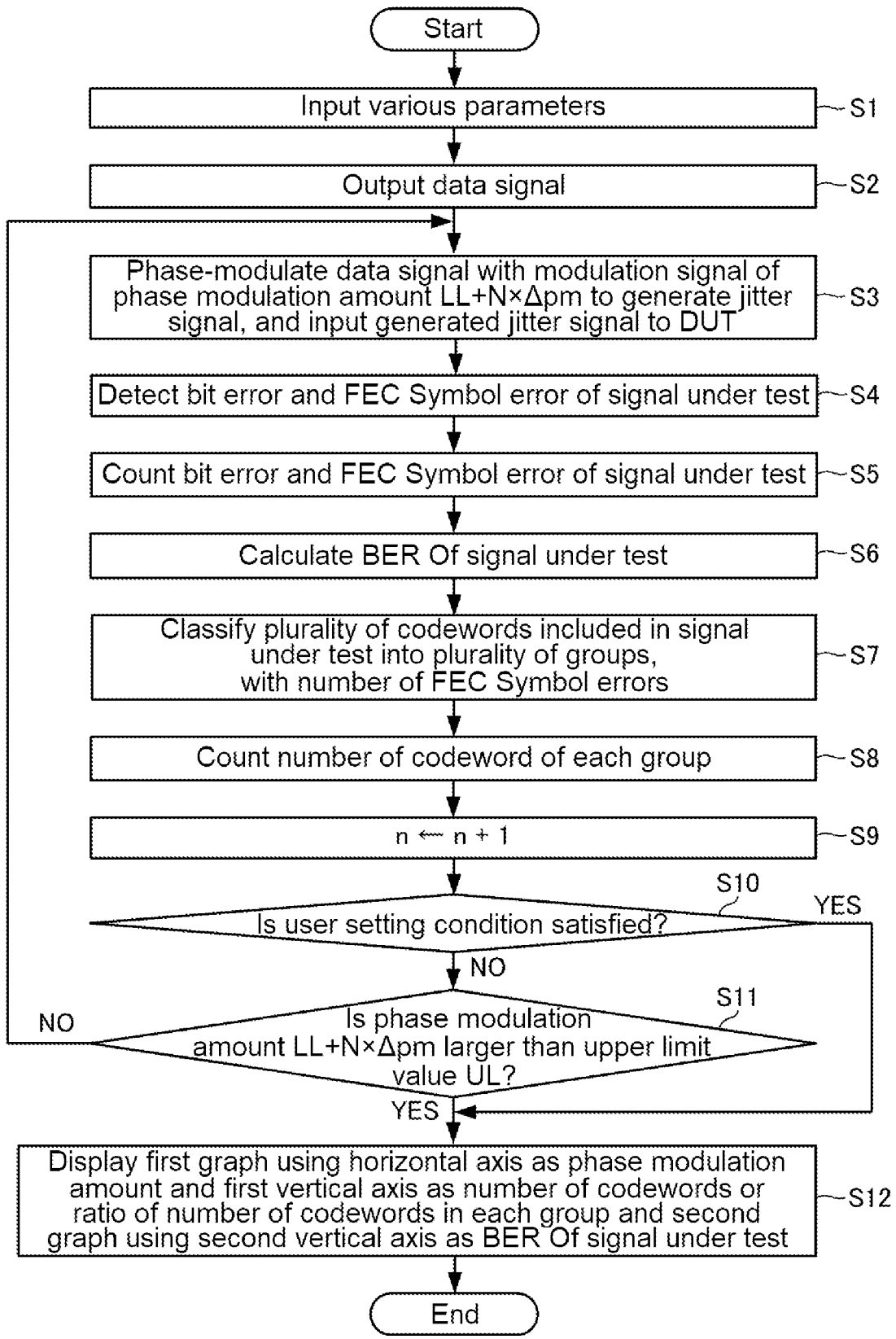
FIG. 6 is a flowchart illustrating a process of a jitter tolerance measurement method using the jitter tolerance measurement apparatus according to the embodiment of the present invention.
Figure 7:
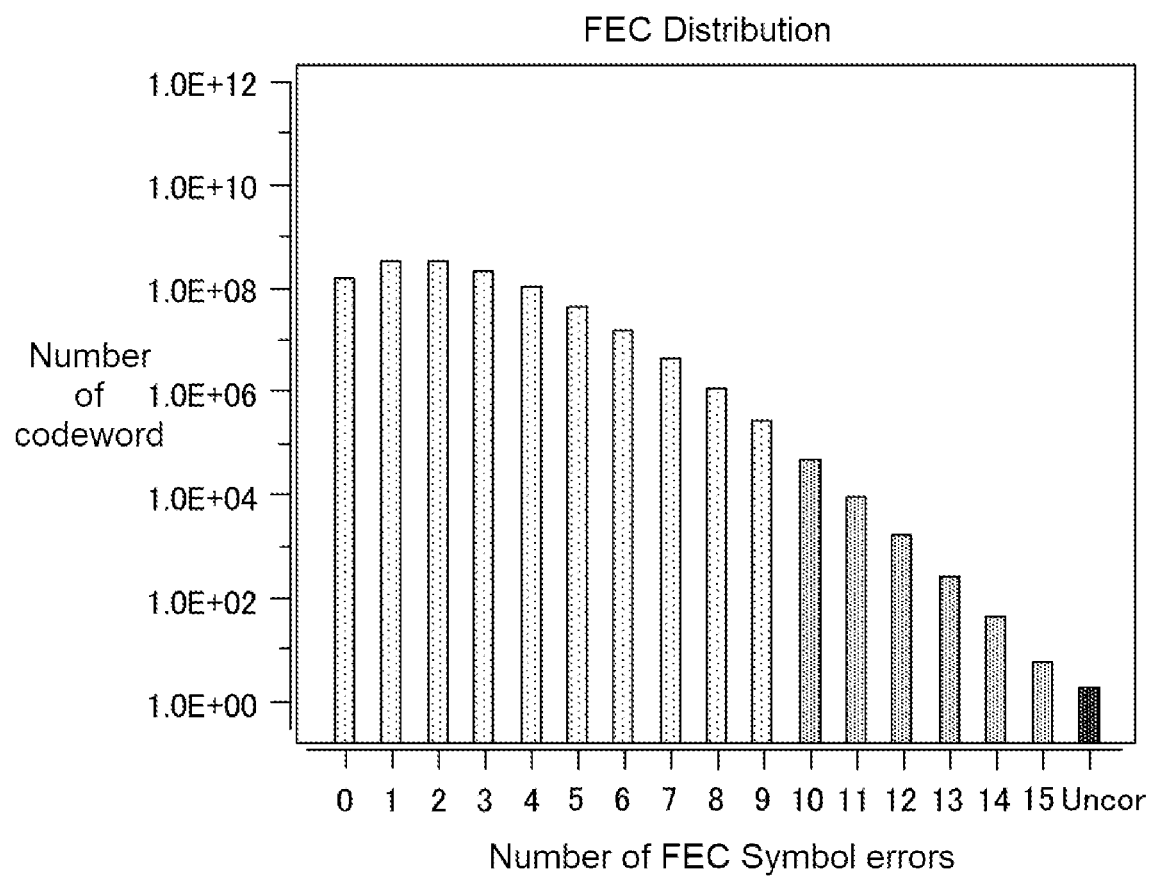
FIG. 7 is a graph illustrating a distribution of the number of FEC symbol errors in the related art.

Hereinafter, an example of processes of a jitter tolerance measurement method using the jitter tolerance measurement apparatus 1 according to the present embodiment will be described with reference to the flowchart in FIG. 6.

First, various parameters are input by an operation to the operation unit 37 by a user (step S1). These parameters include a modulation frequency, a lower limit value LL and an upper limit value UL of a phase modulation amount, a step width $\Delta$pm of the phase modulation amount, and the like.

Next, the data signal output unit 21 outputs a data signal including a plurality of codewords including a plurality of FEC symbols (data signal output step S2).

Next, the jitter signal generator 23 phase-modulates the data signal output in the data signal output step S2 with a modulation signal of the modulation frequency and phase modulation amount LL+n×$\Delta$pm input in step S1 to generate a jitter signal, and inputs the generated jitter signal to the DUT 4 (jitter signal generation step S3). Here, n is an integer equal to or more than 0, and an initial value of n is 0.

Next, the data comparison unit 33 detects a bit error and an FEC symbol error of a signal under test output from the DUT 4 in accordance with the input of the jitter signal (data comparison step S4).

Next, the error counting unit 35b counts the number of bit errors of the signal under test detected by the data comparison step S4 and the number of FEC symbol errors for each codeword of the signal under test detected in the data comparison step S4 for each phase modulation amount LL+n×$\Delta$pm (error counting step S5).

Next, the BER calculation unit 35c calculates a BER of the signal under test, based on the number of bit errors counted in the error counting step S5 (BER calculation step S6).

Next, the CW classification unit 35d classifies a plurality of codewords included in the signal under test into a plurality of groups, based on the number of FEC symbol errors counted in the error counting step S5 (CW classification step S7).

Next, the CW number counting unit 35e counts the number of codewords of the codewords belonging to each group classified in the CW classification step S7 for each phase modulation amount LL+n×$\Delta$pm (CW number counting step S8).

Next, the modulation control unit 35a increments a value of n by 1 (step S9). In addition, step S9 and step S11 correspond to a modulation control step in which the phase modulation amount is controlled to be changed.

Next, the modulation control unit 35a determines whether or not a user setting condition is satisfied such as a condition that uncorrectable codewords more than the number of occurrences of a reference value is detected in the error counting step S5, or a condition that a BER higher than a reference value is calculated in the BER calculation step S6 (step S10). In a case where the above user setting condition is satisfied, the modulation control unit 35a executes a process in step S12. On the other hand, in a case where the above user setting condition is not satisfied, the modulation control unit 35a executes processes after step S11.

Next, the modulation control unit 35a determines whether or not the phase modulation amount LL+n×$\Delta$pm is larger than the upper limit value UL (step S11). In a case where the phase modulation amount LL+n×$\Delta$pm is larger than the upper limit value UL, the modulation control unit 35a executes the process in step S12. On the other hand, in a case where the phase modulation amount LL+n×$\Delta$pm is equal to or less than the upper limit value UL, the modulation control unit 35a executes the processes after step S3 again.

Next, the display control unit 35f controls a display of a first graph on a display screen of the display unit 38, by using the horizontal axis as the phase modulation amount and a first vertical axis as the number of codewords or a ratio of the number of codewords in each group counted in the CW number counting step S8 (display control step S12). Further, the display control unit 35f controls a display of a second graph to be superimposed on the first graph on the display screen of the display unit 38, by using the horizontal axis as the phase modulation amount and the second vertical axis as a BER of the signal under test calculated in the BER calculation step S6 (display control step S12).

The processes in steps S1 to S12 may be repeated after changing parameters such as the modulation frequency, the lower limit value LL and the upper limit value UL of the phase modulation amount, and the step width $\Delta$pm of the phase modulation amount in step S1 as necessary.

As described above, the jitter tolerance measurement apparatus 1 according to the present embodiment classifies a plurality of codewords included in the signal under test into a plurality of groups according to the number of FEC symbol errors, and counts the number of codewords of the codewords belonging to each group for each phase modulation amount. As a result, with the jitter tolerance measurement apparatus 1 according to the present embodiment, it is possible to represent a distribution of FEC symbol errors having different jitter amounts (phase modulation amounts) in one graph, by using a horizontal axis as the phase modulation amount, and a first vertical axis as the number of codewords or a ratio of the number of codewords of each group.

Further, the jitter tolerance measurement apparatus 1 according to the present embodiment can superimpose and display the distribution of the FEC symbol errors and a change of the BER in the graph with the horizontal axis as the phase modulation amount.

Further, since the jitter tolerance measurement apparatus 1 according to the present embodiment displays the distribution of FEC symbol errors in different colors for each group, the distribution of FEC symbol errors can be visually and clearly represented on the graph.

Further, with the jitter tolerance measurement apparatus 1 according to the present embodiment, it is possible to appropriately enlarge and reduce a scale of the first vertical axis by the operation of the operation unit 37 by the user, so that the number of codewords or a ratio of the number of codewords of a low-rate codeword such as an Uncorrectable Codeword can also be visually and clearly represented on the graph.

DESCRIPTION OF REFERENCE NUMERALS AND SIGNS 1 jitter tolerance measurement apparatus
2 jitter generation unit
3 jitter tolerance measurement unit 4 DUT
21 data signal output unit
22 modulation signal generator
23 jitter signal generator
31 signal reception unit
32 synchronization detection unit
33 data comparison unit
35 control unit
35a modulation control unit
35b error counting unit
35c BER calculation unit
35d CW classification unit
35e CW number counting unit
35f display control unit
36 storage unit
37 operation unit
38 display unit

What is claimed is:

1. A jitter tolerance measurement apparatus comprising:
a data signal output unit that outputs a data signal including a plurality of codewords having a plurality of forward error correction (FEC) symbols;
a jitter signal generator that phase-modulates the data signal to generate a jitter signal, and inputs the jitter signal to a device under test (DUT);
a modulation control unit that performs control of changing a phase modulation amount of the jitter signal;
a data comparison unit that detects a bit error and an FEC symbol error of a signal under test output from the device under test (DUT) in accordance with the input of the jitter signal; and
an error counting unit that counts the number of bit errors of the signal under test detected by the data comparison unit and the number of FEC symbol errors for each codeword of the signal under test detected by the data comparison unit,
wherein the error counting unit includes
a codeword classification unit that counts the number of FEC symbol errors for each codeword for each phase modulation amount as the number of FEC symbol errors, and classifies the plurality of codewords included in the signal under test into a plurality of groups with the counted number of FEC symbol errors,
a codeword number counting unit that counts the number of codewords of the codewords belonging to each of the groups classified by the codeword classification unit for each phase modulation amount, and
a display control unit that controls a display of a first graph on a display screen, by using a horizontal axis as the phase modulation amount and a first vertical axis as the number of codewords or a ratio of the number of codewords in each of the groups counted by the codeword number counting unit.

2. The jitter tolerance measurement apparatus according to claim 1, further comprising:
a bit error rate (BER) calculation unit that calculates a bit error rate of the signal under test, based on the number of bit errors counted by the error counting unit,
wherein the display control unit controls a display of a second graph to be superimposed on the first graph on the display screen, by using the horizontal axis as the phase modulation amount and a second vertical axis as the bit error rate of the signal under test calculated by the BER calculation unit.

3. The jitter tolerance measurement apparatus according to claim 1,
wherein the display control unit displays the number of codewords or the ratio of the number of codewords in each of the groups counted by the codeword number counting unit, in different colors for each of the groups in the first graph.

4. The jitter tolerance measurement apparatus according to claim 1, further comprising:
an operation unit that changes a scale of the first vertical axis of the first graph.

5. A jitter tolerance measurement method comprising:
a data signal output step of outputting a data signal including a plurality of codewords having a plurality of forward error correction (FEC) symbols;
a jitter signal generation step of phase-modulating the data signal to generate a jitter signal, and inputting the jitter signal to a device under test (DUT);
a modulation control step of performing control of changing a phase modulation amount of the jitter signal;
a data comparison step of detecting a bit error and an FEC symbol error of a signal under test output from the device under test (DUT) in accordance with the input of the jitter signal; and
an error counting step of counting the number of bit errors of the signal under test detected in the data comparison step and the number of FEC symbol errors for each codeword of the signal under test detected in the data comparison step,
wherein the error counting step includes
a codeword classification step of counting the number of FEC symbol errors for each codeword for each phase modulation amount as the number of FEC symbol errors, and classifying the plurality of codewords included in the signal under test into a plurality of groups with the counted number of FEC symbol errors,
a codeword number counting step of counting the number of codewords of the codewords belonging to each of the groups classified in the codeword classification step for each phase modulation amount, and
a display control step of controlling a display of a first graph on a display screen, by using a horizontal axis as the phase modulation amount and a first vertical axis as the number of codewords or a ratio of the number of codewords in each of the groups counted in the codeword number counting step.

6. The jitter tolerance measurement method according to claim 5, further comprising:
a bit error rate (BER) calculation step of calculating a bit error rate of the signal under test, based on the number of bit errors counted in the error counting step,
wherein in the display control step, a display of a second graph is controlled to be superimposed on the first graph on the display screen, by using the horizontal axis as the phase modulation amount and a second vertical axis as the bit error rate of the signal under test calculated in the BER calculation step.

* * * * *